Nov. 2, 1971  E. M. NUSBICKEL, JR  3,616,684

ULTRASONIC INSPECTION CARRIAGE

Filed Nov. 20, 1969

INVENTOR
Edward M. Nusbickel, Jr.

United States Patent Office 3,616,684
Patented Nov. 2, 1971

3,616,684
ULTRASONIC INSPECTION CARRIAGE
Edward M. Nusbickel, Jr., Allentown, Pa., assignor to
Bethlehem Steel Corporation
Filed Nov. 20, 1969, Ser. No. 878,481
Int. Cl. G01n 24/00
U.S. Cl. 73—71.5   1 Claim

ABSTRACT OF THE DISCLOSURE

A carriage is adapted to be moved relative to a flat workpiece during the ultrasonic inspection thereof. A housing containing a row of transducers is suspended from the carriage whereby, as the housing or carriage traverses undulations in the surface of the workpiece, the row of transducers is maintained horizontal and transversely disposed to the direction of movement of the carriage relative to the workpiece. In addition, the bottom of the housing is maintained at a constant distance from the workpiece, while the vertical axes of said transducers are maintained perpendicular to the plane of the workpiece.

The transducers are ultrasonically coupled to a column of water contained in said housing. A jet of water provides a continuous flow of water between the bottom of said housing and the flat surfaces of said workpiece oppositely disposed therefrom. The housing is supported relative to said flat surfaces such that there is sufficient surface tension to maintain a continuous layer of water between the opposing surfaces of said flat surfaces and said bottom.

BACKGROUND OF THE INVENTION

In the copending application Ser. No. 878,480 filed Nov. 20, 1969 by Russell N. Cressman and Walter J. Bantz, entitled "Ultrasonic Inspection Probe," a transducer housing is described and claimed having as an essential feature thereof a closed end which is oppositely disposed from the transmitting face of the transducer and which is continuously maintained at a constant distance from the surface of a workpiece being inspected. Said housing, which is also described in the preferred embodiment of the instant specification, must have said end maintained close enough to the surface of said workpiece so that a continuous layer of liquid can be maintained between said end and said surface by surface tension. On the other hand, said end must be far enough away from said surface so that scraping of, and consequent damage to, said end is precluded.

If the workpiece has no undulations in the surface thereof, it is a relatively simple matter to continuously maintain both the transducer and said closed end at a constant distance from the surface of that portion of the workpiece being inspected. The presence of undulations, however, poses problems in that said distance is likely to vary and cause variations in the magnitude of the signal received by the transducer. Consequently, an accurate determination of the extent of any defects detected will be precluded.

It is an object of this invention to provide an ultrasonic inspection carriage constructed such that an inaccurate determination of the extent of defect signals due to the abovementioned problems is precluded. It is a further object to provide such a carriage which supports a transducer housing whereby a layer of liquid is continuously maintained between the closed end of said housing and the oppositely disposed surface of a workpiece by surface tension.

SUMMARY OF THE INVENTION

I have discovered that the foregoing objects can be obtained by suspending a housing containing at least one transducer from a carriage adapted to be moved relative to a workpiece during inspection thereof. The housing is suspended such that said transducer is maintained at a constant distance from said workpiece while the vertical axis of said transducer is maintained perpendicular to the surface of that portion of the workpiece being inspected.

DESCRIPTION OF THE PREFERRED EMBODIMENT

Figure 1:
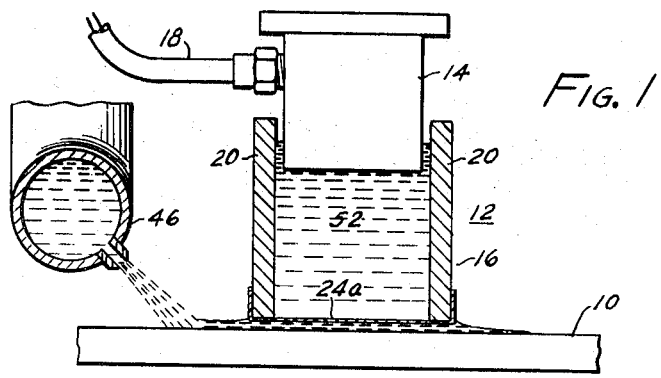
FIG. 1 is a diagrammatic view of a preferred embodiment of the ultrasonic inspection probe of the invention.
Figure 3:
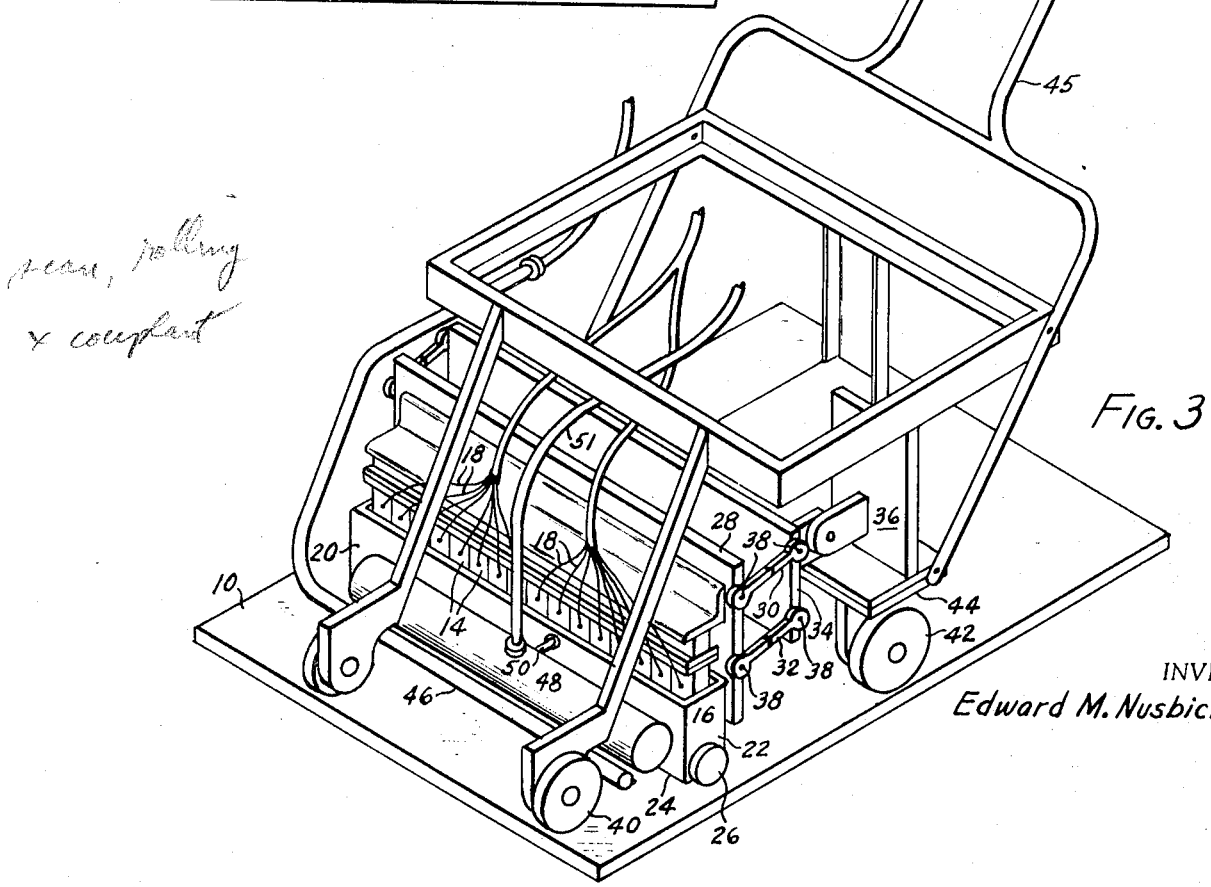
FIG. 3 is a diagrammatic perspective view showing the probe suspended from a carriage.

FIG. 1 shows a workpiece, e.g. a steel plate 10, ultrasonically coupled to an inspection probe broadly designated by the numeral 12. As shown in FIG. 3, said probe comprises a row of transducers 14 mounted in a housing 16. Each of the transducers 14 is connected by wires 18 to circuits which are required for inspection. Such circuits are well known to those familiar with this art, do not constitute a part of this invention, and hence will not be described herein. Preferably, such circuits are those described in copending applications "Ultrasonic Defect Signal Discriminator," by Edward M. Nusbickel, and "Ultrasonic Inspection System With Scanned Multiple Transducers," by Russell N. Cressman, Walter J. Bantz, and said Nusbickel. Both of said applications have been filed concurrently herewith.

The housing 16 comprises longitudinal plates 20, end plates 22, and a closed bottom 24. Rotatably mounted on said end plates 22 are wheels 26 for engaging the surface of the plate 10. The housing 16 is rigidly affixed to a vertically disposed plate 28 which is pivotally connected by means of parallel links 30 and 32 to another vertically disposed plate 34 rigidly affixed to a carriage 36. Said links are joined to the plates 28 and 34 by ball joints 38 so that a certain amount of skewing is possible.

The carriage 36 is necessarily moved relative to the plate 10 during inspection, and to this end is provided with front and rear wheels 40 and 42, respectively, affixed to the carriage framework, designated broadly by the numeral 44. The framework 44 is provided with a handle 45 by means of which the carriage 36 can be moved relative to the plate 10.

Disposed in front of and parallel to the housing 16 is a conduit 46 which is supplied with a coupling liquid, e.g. water, by a reservoir such as a storage tank (not shown) mounted on the carriage 36. The conduit 46 is perforated whereby a jet of water continuously is directed toward the space between the closed bottom 24 of the housing 16 and the flat upper surface of the plate 10. Also disposed forward of the housing 16 is a storage tank 48 containing a coupling liquid, said liquid preferably being water. The tank 48 is connected by a flexible conduit 50 to the housing 16. The tank 48 is supplied with water through the line 51.

Referring again to FIG. 1, a transducer 14 is shown inserted through an opening in the upper end of the housing 16 and coupled to a supply of liquid 52, e.g. water, contained in said housing. Any of the liquid 52 which is lost may be replenished by liquid from the tank 48. It is essential that any reflections of ultrasonic energy from the closed bottom 24 that are received, i.e. absorbed, by the transducer 14 be of a magnitude considerably less than that of the minimum expected defect signal. To this end, the closed bottom 24 perferably comprises a thin film 24a of material having an acoustic impedance similar to that of the liquid 52. If said liquid is water, which has an acoustic impedance of 0.149 gm./cm.$^2$-sec., a preferable material is the rubber sold under the trademark Rho-C and having an acoustic impedance of either 0.146 or 0.151 gm./cm.$^2$-sec.

Alternatively, the film may be chosen sufficiently thin relative to the wavelength of the testing ultrasonic energy that the acoustic impedance of the film need not be so close to that of water. For example, if the film is formed of polystyrene, which has an acoustic impedance of 0.255 gm./cm.$^2$-sec., the film should have a thickness equal to about $\frac{1}{90}$ of the wavelength of the ultrasonic energy for the magnitude of the energy reflected from said film to be equal to about 10% of the magnitude of the energy reflected from the bottom of the plate 10. This percentage would insure that reflections from said film would cause no false defect signals. As a specific example of this alternative form of the invention, a film of polystyrene 0.0005 inch thick could be used satisfactorily at a testing frequency of 2 mHz.

Figure 2:
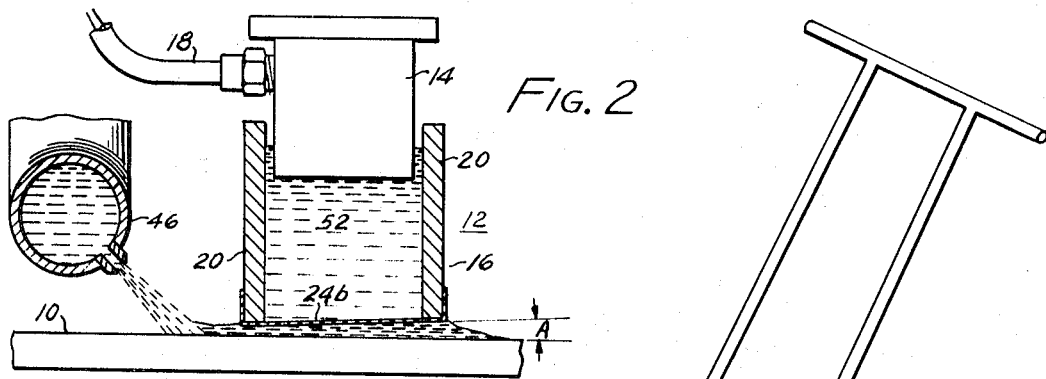
FIG. 2 is a diagrammatic view of an alternative means for containing the column of water through which the ultrasonic energy propagates.

FIG. 2 shows still another form of bottom which can be used for the housing 16. In this embodiment, the film 24b is formed of a material such as polyethylene. The place of the film is disposed at a small angle A, e.g. two degrees, to the horizontal. As a result of this angular disposition, the amount of energy reflected from the film and absorbed by the transducer 14 at a testing frequency of 5 mHz. is insufficient to adversely affect the inspection.

As a result of the housing 16 being suspended from the carriage 36 in the above-described manner, as the housing or carriage traverses undulations in the surface of the workpiece the row of transducers 14 is maintained horizontal and transversely disposed to the direction of movement of the carriage relative to the workpiece. In addition, both the transducers 14 and the closed bottom 24 of the housing 16 are maintained at a constant distance from the workpiece, and the vertical axes of the transducers are maintained perpendicular to the surface of that portion of the workpiece being inspected.

As above described, a conduit 46 continuously directs a jet of water toward the space between the closed bottom 24 of the housing 16 and the flat upper surface of the plate 10. The spacing is sufficiently small so that surface tension causes a continuous layer of said water to be maintained in contact with the opposing surfaces of the closed bottom 24 and the flat upper surface of the plate 10.

I claim:
1. In a device for ultrasonically inspecting a workpiece having a substantially flat surface which may have undulations therein, the improvement comprising:
   (a) a carriage adapted to roll along the surface of said workpiece, said carriage having first and second pairs of wheels spaced apart along the direction of travel of said carriage;
   (b) a housing containing a row of transducers adapted to transmit and receive ultrasonic pulses;
   (c) a pair of wheels connected to opposite ends of said housing and adapted to roll along said surface and maintain said transducers at a predetermined distance above said surface;
   (d) a pair of parallel links connecting each end of said housing to said carriage by means of ball joints, whereby as said housing traverses undulations in said flat surface:
      (1) said housing is suspended from said carriage intermediate said pairs of wheels,
      (2) said row of transducers is horizontal and transversely disposed to the direction of movement of said carriage relative to said workpiece,
      (3) the vertical axes of said transducers are maintained perpendicular to that portion of the surface of the workpiece being inspected, and
      (4) both of said wheels on said housing continuously engage said surface.

References Cited
UNITED STATES PATENTS

| | | | |
|---|---|---|---|
| 2,545,101 | 3/1951 | Meunier | 310—8.7 |
| 3,055,210 | 9/1962 | Joy | 73—67.8 |
| 3,257,843 | 6/1966 | Cowan | 73—71.5 |

FOREIGN PATENTS

| | | | |
|---|---|---|---|
| 1,358,489 | 3/1964 | France | 73—71.5 |
| 739,998 | 11/1955 | Great Britain | 73—71.5 |

RICHARD C. QUEISSER, Primary Examiner

A. E. KORKOSZ, Assistant Examiner

U.S. Cl. X.R.

73—67.5